(12) United States Patent
Schulz

(10) Patent No.: US 11,506,260 B2
(45) Date of Patent: Nov. 22, 2022

(54) PLANETARY GEAR WITHOUT BACKLASH

(71) Applicant: Aktiebolaget SKF, Gothenburg (SE)

(72) Inventor: Ingo Schulz, Gerolzhofen (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/417,135

(22) PCT Filed: Jan. 17, 2020

(86) PCT No.: PCT/EP2020/051099
§ 371 (c)(1),
(2) Date: Jun. 22, 2021

(87) PCT Pub. No.: WO2020/152041
PCT Pub. Date: Jul. 30, 2020

(65) Prior Publication Data
US 2022/0082154 A1    Mar. 17, 2022

(30) Foreign Application Priority Data
Jan. 25, 2019    (DE) .......................... 102019200933.6

(51) Int. Cl.
*F16H 1/28*    (2006.01)
(52) U.S. Cl.
CPC ... *F16H 1/2863* (2013.01); *F16H 2001/2881* (2013.01)

(58) Field of Classification Search
CPC ... F16H 1/2863; F16H 2001/2881; F16H 1/28
See application file for complete search history.

(56) References Cited

U.S. PATENT DOCUMENTS

| | | | |
|---|---|---|---|
| 5,540,630 A * | 7/1996 | Vranish | F16H 1/2863 475/346 |
| 7,544,146 B2 * | 6/2009 | Vranish | F16H 1/2863 475/335 |
| 10,823,258 B2 | 11/2020 | Schulz et al. | |
| 2017/0227093 A1 | 8/2017 | Matsumoto et al. | |

FOREIGN PATENT DOCUMENTS

| | | |
|---|---|---|
| EP | 1394013 A2 | 3/2004 |
| EP | 2693079 A2 | 2/2014 |
| WO | 2017046767 A1 | 3/2017 |

* cited by examiner

*Primary Examiner* — Huan Le
(74) *Attorney, Agent, or Firm* — Garcia-Zamor Intellectual Property Law; Ruy Garcia-Zamor; Bryan Peckjian

(57) ABSTRACT

A planetary gear is disclosed that provides at least a first hollow wheel with a helical gearing and a second hollow wheel with a helical gearing are adapted to rotate in a first rotational direction and a second opposite rotational direction, and a first double planet having a first wheel with a helical gearing meshing with the helical gearing of the first hollow wheel and having a second wheel with a helical gearing meshing with the helical gearing of the second hollow wheel. The disclosed configuration minimizes backlash between the helical gearings.

20 Claims, 2 Drawing Sheets

PLANETARY GEAR WITHOUT BACKLASH

CROSS-REFERENCE TO RELATED APPLICATIONS

This application is the U.S. National Stage of International Application No. PCT/EP2020/051099, filed on Jan. 17, 2020, which claims priority to German patent application no. 102019200933.6 filed on Jan. 25, 2019.

FIELD OF THE INVENTION

The present invention relates to a planetary gear having at least a first hollow wheel and a second hollow wheel and a first double planet.

BACKGROUND OF THE INVENTION

Planetary gears typically comprise multiple wheels or gears. If the gearings of the wheels of such a planetary gear are meshing, there is often backlash between the gearings. For gears that are only running into one rotational direction, this is of no further relevance as the gearings of two meshing wheels come once into contact during start up and then rotate while keeping this contact. Further additional contacting between the gearings does not occur during the further operation.

When the wheels change their rotational direction, i.e. perform a forward and backward motion and/or perform an oscillating movement between the two directions, the backlash between the gearings may cause an uneven motion profile of the wheels. This may lead to an unwanted wear of the wheels.

It is thus an object of the present invention to reduce the backlash between the gearings of the wheels of a planetary gear.

SUMMARY OF THE INVENTION

The planetary gear comprises at least a first hollow wheel with a helical gearing and a second hollow wheel with a helical gearing, wherein the first hollow wheel and the second hollow wheel are adapted to rotate in a first rotational direction and a second opposite rotational direction. The planetary gear further comprises a first double planet having a first wheel with a helical gearing meshing with the helical gearing of the first hollow wheel and having a second wheel with a helical gearing meshing with the helical gearing of the second hollow wheel.

Each helical gearing of the hollow wheels and the double planets has a first side face and a second side face opposite to the first side face. A surface normal of the first side face is directed to the first rotational direction and a surface normal of the second side face is directed to the second rotational direction.

To minimize the backlash between the helical gearings of the wheels of the first double planet and the hollow wheels, a first force exerting element is provided. The first force exerting element exerts a first force in the first direction so that the first side faces of the helical gearings of the first wheel of the first double planet are in contact with the second side faces of the helical gearings of the first hollow wheel and so that the second side faces of the helical gearings of the second wheel of the first double planet are in contact with the first side faces of the helical gearings of the second hollow wheel. Due to this contact, a preload to the hollow wheels in the first rotational direction is provided. By pressing the first double planet into the direction of the first hollow wheel, the helical gearings of the first double planet are in contact with the helical gearings of the first and the second hollow wheel. Due to the preload, a contact between the helical gearings of the hollow wheels and the helical gearings of the wheels of the double planet exists already during start up. In addition, this contact can be kept by means of the first force exerting element during operation by maintaining the preload and thus, a backlash between the helical gearings may be avoided.

The first wheel and the second wheel of the first double planet are fixed in relation to each other. By this fixation, it is possible to exert the first force simultaneously to both wheels of the first double planet so that the first side faces of the helical gearings of the first wheel as well as the second side faces of the second wheel of the first double planet are in contact with the second side faces of the helical gearings of the first hollow wheel and the first side faces of the helical gearings of the first hollow wheel, respectively.

One of the hollow wheels may be implemented as an input which is typically used in planetary gear, i.e. an element which is driven by a shaft, wherein the other hollow wheel may act as output. As the first double planet is in contact with the first hollow wheel with the first wheel and is in contact with the second hollow wheel via the second wheel, the movement of the hollow wheel acting as input is transferred to the hollow wheel acting as output. Also, other combinations are possible. For example, a planetary carrier may be provided which acts as input. In addition, the planetary gear may comprise a sun wheel or one of the hollow wheels may act as a sun wheel.

If only one double planet is used, the two hollow wheels may move in relation to each other. To avoid such a movement, the planetary gear may comprise a second double planet having a first wheel with a helical gearing meshing with the helical gearing of the first hollow wheel and a second wheel with a helical gearing meshing with the helical gearing of the second hollow wheel, and may comprise a second force exerting element exerting a second force in a second direction opposite to the first direction so that the second side faces of the helical gearings of the first wheel of the second double planet are in contact with the first side faces of the helical gearing of the first hollow wheel and that the first side faces of the helical gearings of the second wheel of the second double planet are in contact with the second side faces of the helical gearing of the second hollow wheel thereby providing a preload to the hollow wheels in the second rotational direction.

By using a first and a second double planet, the stability in the planetary gear may be improved. Using the second double planet, it may be avoided that the first double planet moves in relation to the first and the second hollow wheel. For this purpose, the first and the second double planet may also be coupled via a planetary carrier. The planetary carrier may act as an input for transferring a force from the shaft to the double planets and thus to the hollow wheels.

The backlash between the two hollow wheels and the double planets is avoided due to the usage of the preloaded double planets. Due to the preload of the second double planet which is in the opposite direction to the preload of the first double planet, backlash between the gearings may be avoided and further improved. In addition, the equal distribution of the force due to the two double planets may keep the hollow wheels in place.

According to a further embodiment, the planetary gear comprises an even number of double planets, wherein a first half of the double planets is preloaded in the first rotational direction and wherein a second half of the double planets are preloaded in the second rotational direction. By providing an even number of double planets, the first force and the second force may be equally distributed over the number of double planets. Also, the preload in the first rotational direction and the preload in the second rotational direction may be equally distributed.

In a preferred embodiment, the first half and the second half of the double planets are alternatingly arranged. This may further improve the equal distribution of the first and second force as well as of the preload in the first rotational direction and the preload in the second rotational direction.

According to a further embodiment, the first force and the second force are higher than an axial force being exerted by the meshing of the helical gearings of the double planets and the hollow wheels during rotation. By such a distribution between the first and second force and the axial forces, an elastic behavior of the system may be reduced. This means that it may be avoided that the double planets move in the first and second direction during operation of the planetary gear.

In the planetary gear, the first force and the second force are preferably equal. Also, when an uneven number of double planets is used, the total amount of the first force and the total amount of the second force are preferably equal.

According to a further embodiment, the force exerting element may be a spring element, a magnetic element and/or hydraulic element. Also, any other kind of force exerting element may be possible.

According to a further embodiment, the planetary gear further comprises at least one force exerting limiting element for allowing a movement of the double planets in one direction, in particular wherein a movement in the other direction may be locked. The force exerting limiting element may be used for allowing the double planets to move in the direction of the first force and the second force, only, wherein the other direction is locked.

The locking element can consist of a ratchet mechanism which may use force or form closure. Such a mechanism may be based on principle solutions like self-jamming cams or asymmetric teeth.

Further advantages and preferred embodiments are disclosed in the claims, the description and the figures. It should be further noted that a person skilled in the art may regard or use the presented features individually or combine the presented features otherwise than indicated without extending the scope of the invention.

In the following, the present invention will be described by means of embodiments shown in the figures. The shown embodiments are exemplarily, only, and are not intended to limit the scope of protection. The scope of protection is solely defined by the attached claims.

BRIEF DESCRIPTION OF THE DRAWINGS

In the following same or similar functioning elements are indicated with the same reference numerals.

DETAILED DESCRIPTION OF THE INVENTION

Figure 1:
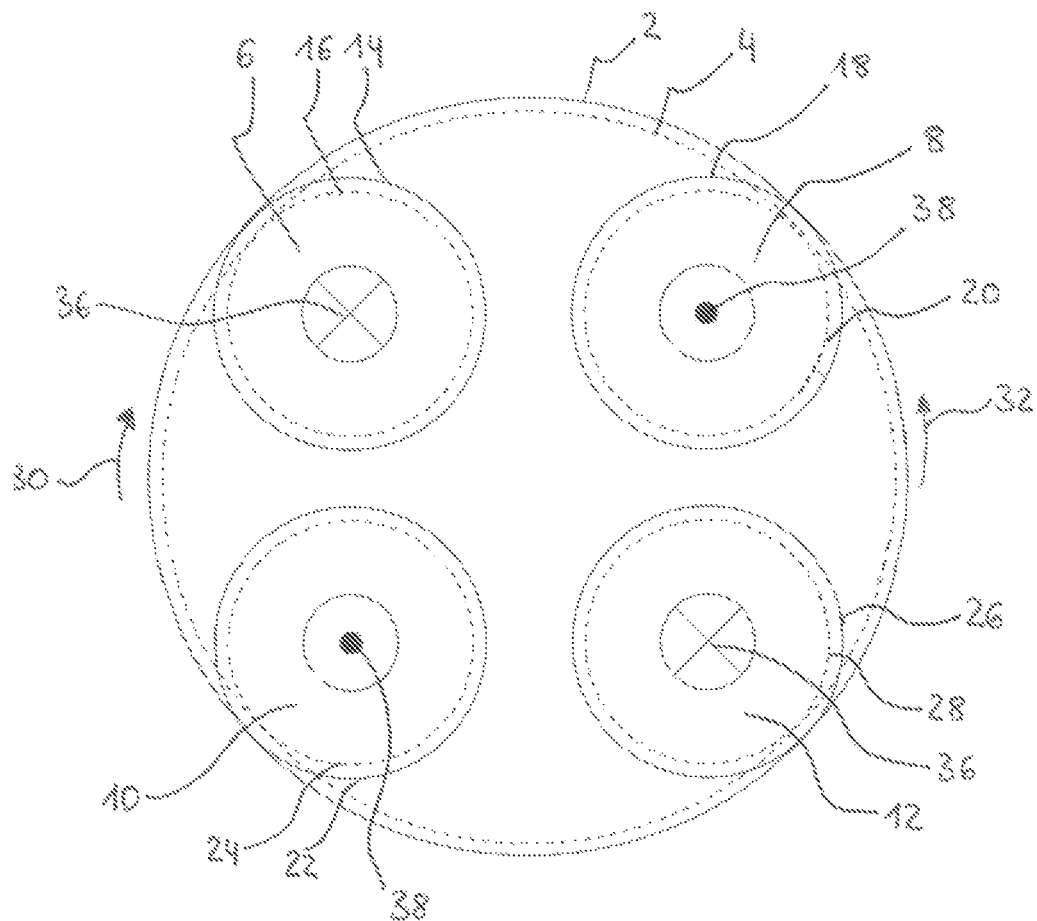
FIG. 1 shows a top view of a planetary gear.

FIG. 1 shows a planetary gear 1, which comprises a first hollow wheel 2 and a second hollow wheel 4. The planetary gear 1 further comprises a first double planet 6, a second double planet 8, a third double planet 10, and a fourth double planet 12. The double planets 6, 8, 10, 12 may be coupled by means of a planetary carrier (not shown), which may be arranged between the double planets 6, 8, 10, 12. The planetary gear 1 may also comprise only one double planet 6, or any other number of double planets 6, 8, 10, 12. Furthermore, a sun wheel (not shown) in addition to or as replacement of one or both hollow gears may be used.

In the embodiment shown in FIG. 1, the first hollow wheel 2 is greater than the second hollow wheel 4. The first hollow wheel 2 may act as an input and the second hollow wheel 4 may act as an output. Also, other embodiments as well as proportions of the hollow wheels 2, 4 and the double planets 6, 8, 10, 12 are possible.

The double planets 6, 8, 10, 12 each comprise two wheels 14, 16; 18, 20; 22, 24; 26, 28. The first wheels 14, 18, 22, 26 are in contact with the first hollow wheel 2 and the second wheels 16, 20, 24, 28 are in contact with the second hollow wheel 4. Due to this contact between the double planets 6, 8, 10, 12 and the hollow wheels 2, 4, a movement of the first hollow wheel 2 in a first rotational direction 30 or a second rotational direction 32 is transferred to the second hollow wheel 4 and vice versa. The rotational directions 30, 32 of the hollow wheels 2, 4 are indicated by arrows 30, 32 in the figures.

Figure 2:
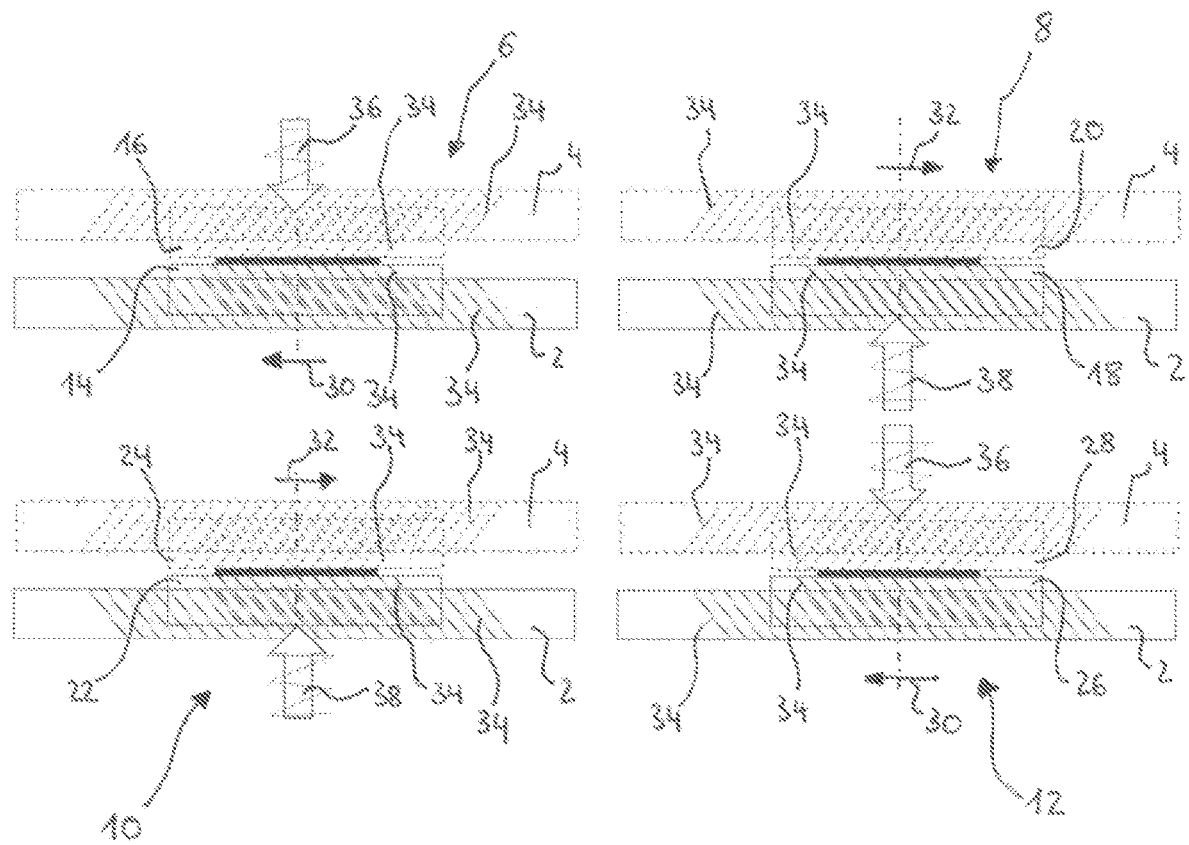
FIG. 2 shows a sectional view of the planetary gear of FIG. 1.

FIG. 2 shows sectional views of each double planet 6, 8, 10, 12 in combination with the hollow wheels 2, 4. As can be seen in FIG. 2, the hollow wheels 2, 4 and the double planets 6, 8, 10, 12 each have a helical gearing 34. Each helical gearing 34 has a first side face and a second side face opposite to the first side face. A surface normal of the first side faces is directed to the first rotational direction 30 of the first and second hollow wheel 2, 4 and a surface normal of the second side faces are directed to the second rotational direction 32 of the hollow wheels 2, 4.

When the wheels (the hollow wheels 2, 4 and thus also the wheels 14, 16; 18, 20; 22, 24; 26, 28 of the double planets 6, 8, 10, 12) change their rotational direction 30, 32, i.e. perform a forward and backward motion and/or perform an oscillating movement between the two rotational directions, a backlash between the gearings 34 may cause an uneven motion profile of the wheels.

To minimize the backlash between the helical gearings 34 of the wheels 14, 16; 18, 20; 22, 24; 26, 28 of the double planets 6, 8, 10, 12 and the hollow wheels 2, 4, one or more force exerting elements 36, 38 may be provided. A first force exerting element 36 exerts a first force in a first direction and a second force exerting element 38 exerts a second force in a second direction opposite to the first direction. The first direction and the second direction are perpendicular to the first and the second rotational direction 30, 32.

In the embodiment shown in FIGS. 1 and 2, the first force is applied to the first and fourth double planet 6, 12 and the second force is applied to the second and third double planet 8, 10. Due to the first force, the first side faces of the helical gearings 34 of the first wheels 14, 26 of the first and fourth double planet 6, 12 are in contact with the second side faces of the helical gearings of the first hollow wheel 2. In addition, the second side faces of the helical gearings 34 of the second wheels 16, 28 of the first and fourth double planet 6, 12 are in contact with the first side faces of the helical gearings of the second hollow wheel 4. Due to this contact, a preload to the hollow wheels 2, 4 in the first rotational direction 30 is provided.

In addition, due to the second force, the second side faces of the helical gearings 34 of the first wheels 18, 22 of the second and third double planet 8, 10 are in contact with the first side faces of the helical gearings of the first hollow wheel 2. In addition, the first side faces of the helical gearings 34 of the second wheels 20, 24 of the second and third double planet 8, 10 are in contact with the second side faces of the helical gearings of the second hollow wheel 4. Due to this contact, a preload to the hollow wheels 2, 4 in the second rotational direction 32 is provided.

By pressing the first and fourth double planet 6, 12 into the direction of the first hollow wheel 2, the helical gearings 34 of the first and fourth double planet 6, 12 are in contact with the helical gearings of the first and the second hollow wheel 2, 4. By pressing the second and third double planet 8, 10 into the direction of the second hollow wheel 4, the helical gearings 34 of the second and third double planet 8, 10 are in contact with the helical gearings of the first and the second hollow wheel 2, 4.

Due to this preload, a contact between the helical gearings 34 of the hollow wheels 2, 4 and the helical gearings 34 of the wheels 14, 16; 18, 20; 22, 24; 26, 28 of the double planets 6, 8, 10, 12 exists already during start up. In addition, this contact can be kept by means of the force exerting elements 36, 38 during operation by maintaining the preload and thus, a backlash between the helical gearings 34 may be avoided.

The force exerting elements 36, 38 may be implemented for example as springs, magnetic elements, hydraulic elements or any other kind of element being able to exert a force to the double planets 6, 8, 10, 12. Preferably, the total amount of the first force exerted by the first force exerting elements 36 and the total amount of the second force exerted by the second force exerting elements 38 is equal.

Due to the preload of the double planets with respect to the hollow wheels in the first and/or the second rotational direction, backlash between the gearings of the double planets and the hollow wheels may be minimized.

LIST OF REFERENCE SIGNS

1 planetary gear
2 first hollow wheel
3 second hollow wheel
6 first double planet
8 second double planet
10 third double planet
12 fourth double planet
14 first wheel of the first double planet
16 second wheel of the first double planet
18 first wheel of the second double planet
20 second wheel of the second double planet
22 first wheel of the third double planet
24 second wheel of the third double planet
26 first wheel of the fourth double planet
28 second wheel of the fourth double planet
30 first rotational direction
32 second rotational direction
34 helical gearing
36 first force exerting element
38 second force exerting element

The invention claimed is:

1. A planetary gear comprising:
a first hollow wheel with a helical gearing and a second hollow wheel with a helical gearing, wherein the first hollow wheel and the second hollow wheel are adapted to rotate in a first rotational direction and a second opposite rotational direction, and
a first double planet having a first wheel with a helical gearing meshing with the helical gearing of the first hollow wheel and having a second wheel with a helical gearing meshing with the helical gearing of the second hollow wheel,
wherein each helical gearing has a first side face and a second side face opposite to the first side face, wherein a surface normal of the first side face is directed to the first rotational direction and a surface normal of the second side face is directed to the second rotational direction, wherein
a first force exerting element being configured to exert a first force in only a first direction and being configured to press the first double planet into the first hollow wheel so that the first side faces of the helical gearings of the first wheel of the first double planet are in contact with the second side faces of the helical gearing of the first hollow wheel and that the second side faces of the helical gearings of the second wheel of the first double planet are in contact with the first side faces of the helical gearing of the second hollow wheel, providing a preload to the hollow wheels in the first and the second rotational direction.

2. The planetary gear according to claim 1, further comprising a second double planet having a first wheel with a helical gearing meshing with the helical gearing of the first hollow wheel and having a second wheel with a helical gearing meshing with the helical gearing of the second hollow wheel, and comprising a second force exerting element being configured to exert a second force in only a second direction opposite to the first direction and being configured to press the second double planet into the second hollow wheel so that the second side faces of the helical gearings of the first wheel of the second double planet are in contact with the first side faces of the helical gearing of the first hollow wheel and that the first side faces of the helical gearings of the second wheel of the second double planet are in contact with the second side faces of the helical gearing of the second hollow wheel, providing a preload to the hollow wheels in the first and the second rotational direction.

3. The planetary gear according to claim 2, wherein the first force and the second force are higher than an axial force being exerted by the meshing of the helical gearings of the double planets and the hollow wheels during rotation.

4. The planetary gear according to claim 2, wherein the first force and the second force are equal.

5. The planetary gear according to claim 1, further comprising an even number of double planets, wherein a first half of the double planets are preloaded in the first rotational direction and wherein a second half of the double planets are preloaded in the second rotational direction.

6. The planetary gear according to claim 5, wherein the first half and the second half of the double planets are alternatingly arranged.

7. The planetary gear according to claim 1, wherein the force exerting element is a spring element, a pneumatic element, a magnetic element and/or a hydraulic element.

8. A planetary gear comprising:
a first hollow wheel with a helical gearing and a second hollow wheel with a helical gearing, wherein the first hollow wheel and the second hollow wheel are adapted to rotate in a first rotational direction and a second opposite rotational direction, and
two first double planets having a first wheel with a helical gearing meshing with the helical gearing of the first hollow wheel and having a second wheel with a helical gearing meshing with the helical gearing of the second hollow wheel, wherein each helical gearing has a first side face and a second side face opposite to the first side face, wherein a surface normal of the first side face is directed to the first rotational direction and a surface normal of the second side face is directed to the second rotational direction, wherein two first force exerting elements exerting a first force in a first direction so that the first side faces of the helical gearings of the first wheels of the first double planets are in contact with the second side faces of the helical gearing of the first hollow wheel and that the second side faces of the helical gearings of the second wheels of the first double planets are in contact with the first side faces of the helical gearing of the second hollow wheel, providing a preload to the hollow wheels in the first and the second rotational direction, two second double planets having a first wheel with a helical gearing meshing with the helical gearing of the first hollow wheel and having a second wheel with a helical gearing meshing with the helical gearing of the second hollow wheel, and two second force exerting elements exerting a second force in a second direction opposite to the first direction so that the second side faces of the helical gearings of the first wheels of the second double planets are in contact with the first side faces of the helical gearing of the first hollow wheel and that the first side faces of the helical gearings of the second wheels of the second double planets are in contact with the second side faces of the helical gearing of the second hollow wheel, providing a preload to the hollow wheels in the first and the second rotational direction, wherein both first double planets and both second double planets are preloaded in a direction parallel to an axis of rotation.

9. The planetary gear according to claim 8, further comprising an even number of double planets, wherein a first half of the double planets are preloaded in the first rotational direction and wherein a second half of the double planets are preloaded in the second rotational direction.

10. The planetary gear according to claim 9, wherein the first half and the second half of the double planets are alternatingly arranged.

11. The planetary gear according to claim 8, wherein the first force and the second force are higher than an axial force being exerted by the meshing of the helical gearings of the double planets and the hollow wheels during rotation.

12. The planetary gear according to claim 8, wherein the first force and the second force are equal.

13. The planetary gear according to claim 8, wherein the force exerting element is a spring element, a pneumatic element, a magnetic element and/or a hydraulic element.

14. A planetary gear comprising:
a first hollow wheel with a helical gearing and a second hollow wheel with a helical gearing, wherein the first hollow wheel and the second hollow wheel are adapted to rotate in a first rotational direction and a second opposite rotational direction, wherein the planetary gear comprises no sun gear, and a first double planet having a first wheel with a helical gearing meshing with the helical gearing of the first hollow wheel and having a second wheel with a helical gearing meshing with the helical gearing of the second hollow wheel, wherein each helical gearing has a first side face and a second side face opposite to the first side face, wherein a surface normal of the first side face is directed to the first rotational direction and a surface normal of the second side face is directed to the second rotational direction, wherein a first force exerting element exerting a first force in a first direction so that the first side faces of the helical gearings of the first wheel of the first double planet are in contact with the second side faces of the helical gearing of the first hollow wheel and that the second side faces of the helical gearings of the second wheel of the first double planet are in contact with the first side faces of the helical gearing of the second hollow wheel, providing a preload to the hollow wheels in the first and the second rotational direction.

15. The planetary gear according to claim 14, further comprising a second double planet having a first wheel with a helical gearing meshing with the helical gearing of the first hollow wheel and having a second wheel with a helical gearing meshing with the helical gearing of the second hollow wheel, and comprising a second force exerting element exerting a second force in a second direction opposite to the first direction so that the second side faces of the helical gearings of the first wheel of the second double planet are in contact with the first side faces of the helical gearing of the first hollow wheel and that the first side faces of the helical gearings of the second wheel of the second double planet are in contact with the second side faces of the helical gearing of the second hollow wheel, providing a preload to the hollow wheels in the first and the second rotational direction.

16. The planetary gear according to claim 15, wherein the first force and the second force are higher than an axial force being exerted by the meshing of the helical gearings of the double planets and the hollow wheels during rotation.

17. The planetary gear according to claim 15, wherein the first force and the second force are equal.

18. The planetary gear according to claim 14, further comprising an even number of double planets, wherein a first half of the double planets are preloaded in the first rotational direction and wherein a second half of the double planets are preloaded in the second rotational direction.

19. The planetary gear according to claim 18, wherein the first half and the second half of the double planets are alternatingly arranged.

20. The planetary gear according to claim 14, wherein the force exerting element is a spring element, a pneumatic element, a magnetic element and/or a hydraulic element.

* * * * *